US 6,644,146 B2

(12) United States Patent
Ford et al.

(10) Patent No.: US 6,644,146 B2
(45) Date of Patent: Nov. 11, 2003

(54) SECURE ATTACHMENT OF STEERING WHEEL TO STEERING SHAFT

(75) Inventors: Brian C. Ford, Mt. Clemens, MI (US); Derek Perkins, Farmington Hills, MI (US); Thomas A. Ennis, Troy, MI (US)

(73) Assignee: Breed Automotive Technology, Inc., Lakeland, FL (US)

( * ) Notice: Subject to any disclaimer, the term of this patent is extended or adjusted under 35 U.S.C. 154(b) by 0 days.

(21) Appl. No.: 10/097,468

(22) Filed: Mar. 14, 2002

(65) Prior Publication Data

US 2002/0088302 A1 Jul. 11, 2002

Related U.S. Application Data

(62) Division of application No. 09/195,387, filed on Nov. 18, 1998, now Pat. No. 6,357,320.

(51) Int. Cl.[7] .............................. B62D 1/16; B60R 25/02
(52) U.S. Cl. ........................ 74/552; 280/731; 403/354
(58) Field of Search ............................ 74/552; 280/731, 280/728.2; 403/379.4, 374.2, 354, 492

(56) References Cited

U.S. PATENT DOCUMENTS 5,172,607 A * 12/1992 Wu ............................. 74/552
6,457,743 B1 * 10/2002 Steffens, Jr. ................. 74/552

\* cited by examiner

Primary Examiner—David A. Bucci
Assistant Examiner—Colby Hansen
(74) Attorney, Agent, or Firm—Markell Seitzman

(57) ABSTRACT

A unique and simple method for attaching a steering wheel to a steering shaft includes a pair of securement members. The steering shaft is provided with a slot extending into an enlarged space. The first securement member extends across a bore in the steering wheel, and is threadably received in the second securement member. The steering wheel can be moved onto the steering shaft with the first securement member moving through the slot and into the space. The first securement member can then draw the second securement member into the space. Preferably, there is a tapered interface between the second securement member, the steering wheel, and the steering shaft. The tapered surface drives the steering wheel downwardly onto the steering shaft such that a wedge-lock is provided. In a further feature of this invention, an outer housing surrounds the steering shaft. The outer housing has a pair of spaced slots. The spaced slots selectively provide access to the securement members such that the steering wheel may be removable from the steering shaft, when desired. However, when the steering shaft is locked, the slots are not aligned with the securement members. This will deter theft of the steering wheel assembly. The present invention is particularly useful for modular steering wheel assemblies which incorporate an air bag into the steering wheel.

5 Claims, 11 Drawing Sheets

SECURE ATTACHMENT OF STEERING WHEEL TO STEERING SHAFT

This application is a division of application Ser. No. 09/195,387, filed Nov. 18, 1998 now U.S. Pat. No. 6,357,320.

BACKGROUND OF THE INVENTION

This invention relates to a simple apparatus and method for securing a steering wheel to a steering shaft, and further to a method and apparatus for preventing theft of the steering wheel.

In the prior art, steering wheels have traditionally been attached to a steering shaft prior to attachment of the air bag. Typically, the steering wheel was attached to the steering shaft by a bolt or a nut if the shaft is threaded. The air bag was then attached to the steering wheel module which included a cover, air bag and inflator.

More recently, there has been an effort to produce so-called "modular" steering wheel and air bag assemblies. These assemblies use attachment techniques that allow the combined air bag module and steering wheel to be attached to the steering shaft as a pre-assembled modular unit.

In general, the prior art methods of attaching modular steering wheel assemblies to the steering shafts have been complex. Further, the methods have been relatively expensive, bulky and inelegant. Generally, the attachment methods rely on threaded connections between the steering shaft and the steering wheel hub. Typically, some form of a threaded member is driven relative to the hub and steering shaft to drive the hub onto the steering shaft.

These connections have typically been driven from the side of the hub, and have required access to be provided to the threaded member. Air bag theft is becoming an increasing problem. With modular steering wheel assemblies, there is an increased likelihood of theft of the steering wheel. With the prior art modular steering wheel proposals, since there has needed to be access to the threaded member, there is also access for a thief which would facilitate the removal of the steering wheel. This is, of course, undesirable.

SUMMARY OF THE INVENTION

In a disclosed embodiment of this invention, the steering wheel hub is attached to the steering shaft by providing the steering shaft with a slot extending from an end of the shaft, and leading into an enlarged securement space. A first securement member extends across a bore in the hub, and is received to draw a second securement member into the bore. The first securement member is preferably of a relatively small dimension, and fits through the slot in the steering shaft. The second securement member is preferably of a greater dimension, and does not fit through the slot. When the hub is placed on the steering shaft, the first securement member passes through the slot and into the enlarged space. The first securement member then draws the second securement member into the space. The second securement member thus locks the steering shaft onto the hub member. Tapered interface surfaces between the steering shaft and hub are forced together to provide a "wedge lock", as described below.

The present invention thus provides a secure connection in a relatively small space.

In a preferred embodiment, the first securement member is externally threaded and the second securement member is internally threaded. The second securement member is preferably also tapered from an end remote from the space, and becoming smaller toward an end adjacent the securement space. This tapered surface rides along a mating tapered surface within the steering shaft. Thus, as the second securement member moves into the space, it forces the hub downwardly onto the shaft such that a wedge lock occurs. After connection, should one of the first or second securement members come loose or break, there is still a secure connection from the wedge lock.

In a further feature of this invention, a removal portion extends within the hub and across an upper surface of the steering shaft. The removal portion is preferably also provided by a threaded removal member and a tapered removal member. The taper action is reversed from the securement members such that as the threaded removal member draws the tapered removal member across an end surface of the steering shaft, the hub is forced upwardly off of the shaft, breaking the wedge lock. The first and second securement members preferably must be released or removed before the removal members can break the wedge lock.

The two structures (i.e., securement and removal) in combination provide a very inexpensive, compact, yet reliable way of securing and removing the steering wheel from the steering shaft. The structures provide improvements over the prior art methods for securing modular steering wheel and air bag assemblies to steering shafts.

In a further feature of this invention, the steering shaft is received within a fixed outer housing. The fixed outer housing has slots which provide access to the securement members in the hub. The slots are thus utilized to allow the steering wheel to be secured to the steering shaft.

The removal structure preferably is also aligned with an access opening. The access opening for the removal structure may be permanently accessible. To remove the wheel, the removal structure is actuated to break the wedge lock. However, unless the securement structure has been previously removed, the removal structure cannot remove the wheel as the securement structure prevents movement of the steering wheel relative to the steering shaft.

The slots on the outer housing are selected such that when the steering shaft is locked, as is the case when the ignition keys are removed from the vehicle, the securement members in the hub are not aligned with the slots in the outer housing. Thus, a thief does not have easy access to the securement location on the steering wheel, and theft of the steering wheel and air bag is less likely.

These and other features of the present invention can be best understood from the following specification and drawings, the following of which is a brief description.

DETAILED DESCRIPTION OF A PREFERRED EMBODIMENT

Figure 1A:
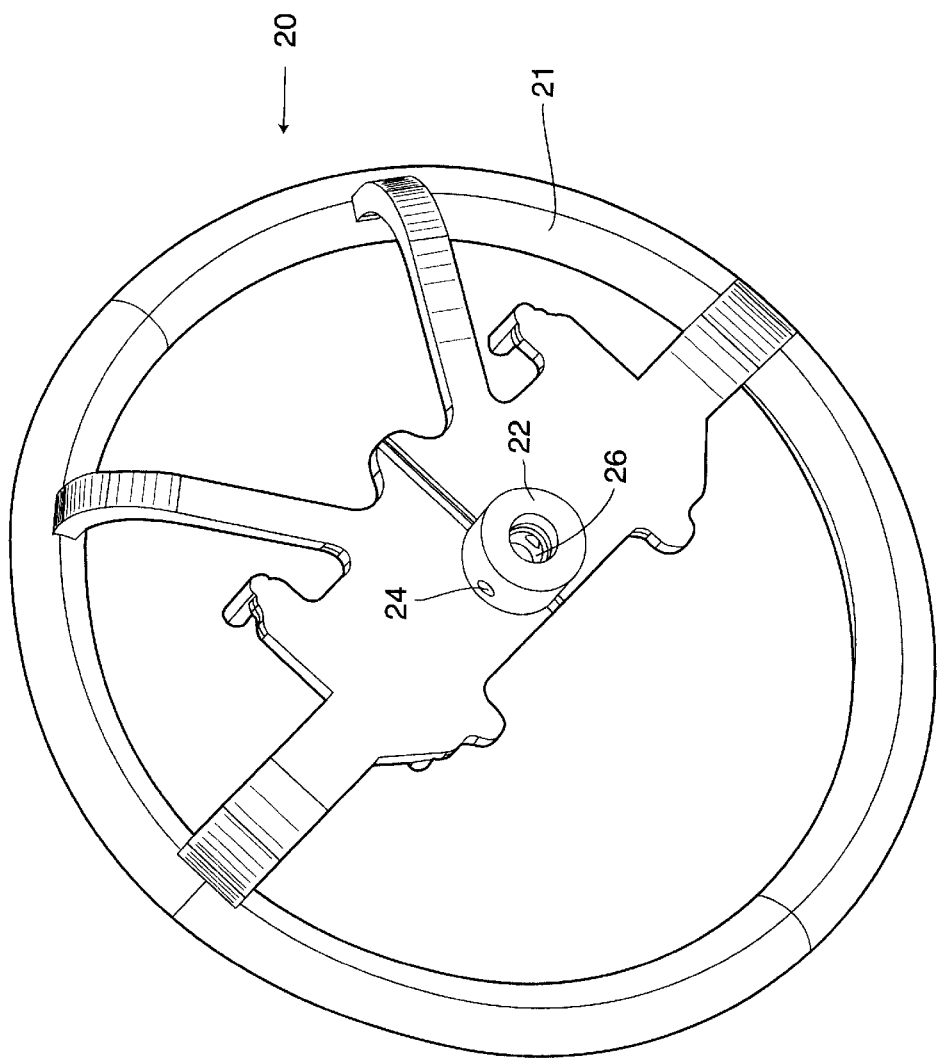
FIG. 1A shows a steering wheel incorporated into the present invention.

A steering wheel 20 is illustrated in FIG. 1A having a body 21 including a hub boss 22 extending away from a planar surface of the body 21. An opening 24 extends into the boss 22 to provide access to an interior tapered bore 26.

Figure 1B:
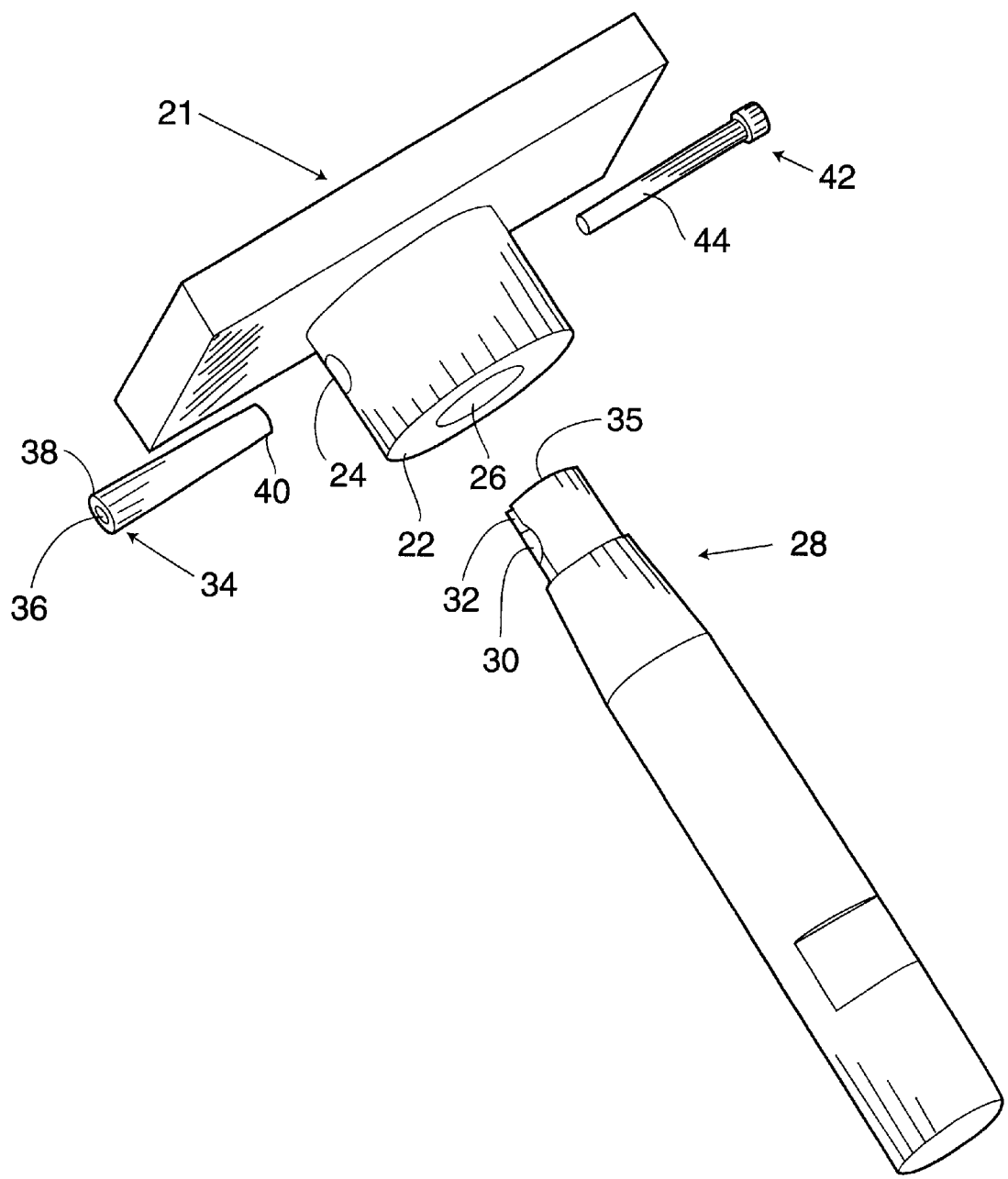
FIG. 1B is an assembly view of a connection according to the present invention.

As shown in FIG. 1B, the steering shaft 28 has an enlarged space 30 extending to a slot 32 which connects the space 30 to the opposed end 35 of the steering shaft 28. The securement structure for connecting the steering wheel body 21 to the steering shaft 28 includes a taper pin 34 having an opening 36 extending between an outer end 38 and an opposed inner end 40. Notably, opening 36 need not extend all the way through pin 34 although that is preferred. Opening 36 need only be long enough to receive pin 42. As can be appreciated from FIG. 1B, the pin 34 is tapered and has a larger diameter at end 38 than it does at end 40.

Pin 34 is received in one side of opening 24. A pin 42 is externally threaded at 44, and extends into an opposed side of the opening 24.

Figure 1C:
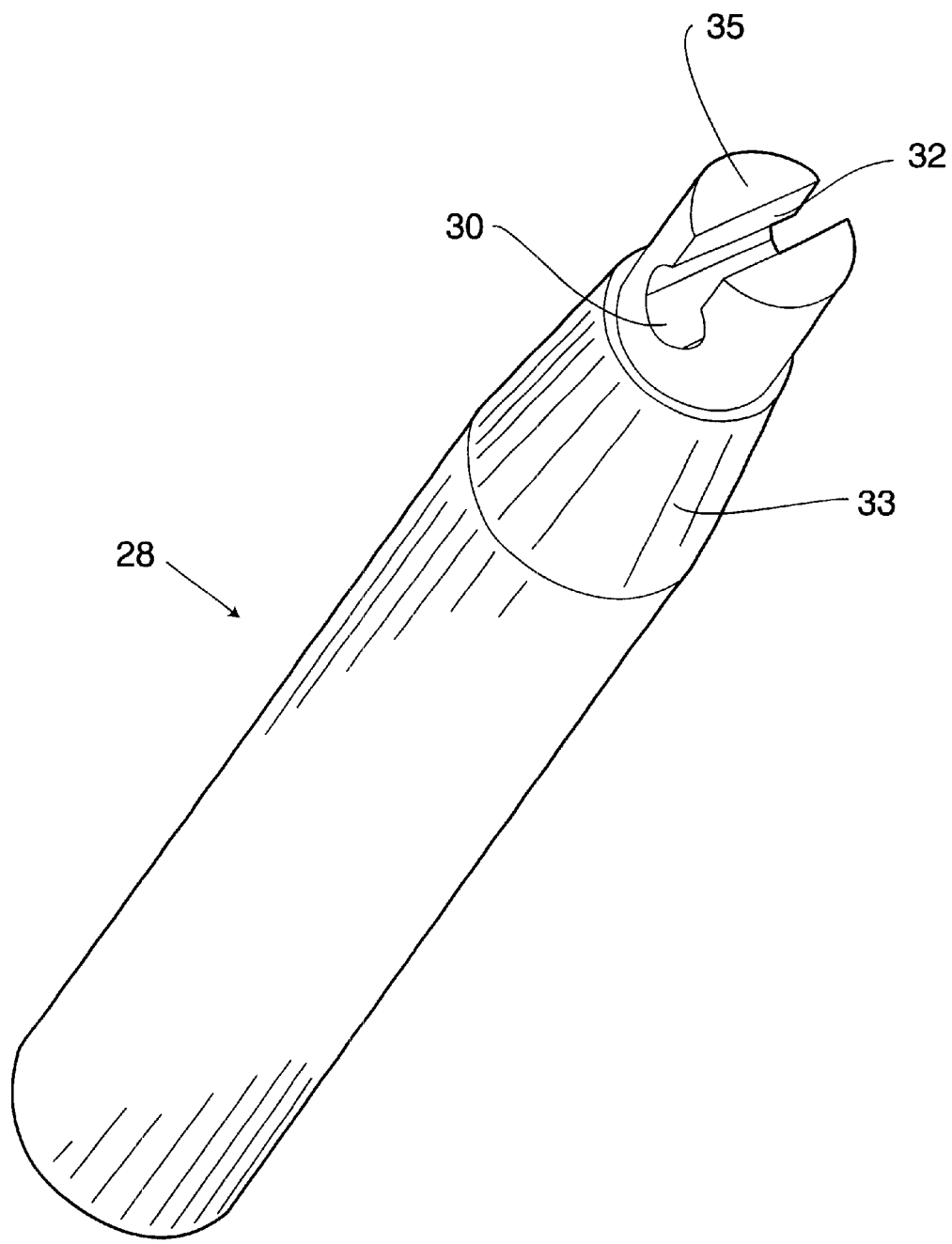
FIG. 1C shows an inventive steering shaft according to the present invention.

FIG. 1C shows the steering shaft 28. As can be appreciated, there is a tapered surface 33 on the steering shaft 28 beneath the space 30 and the slot 32.

Figure 2:
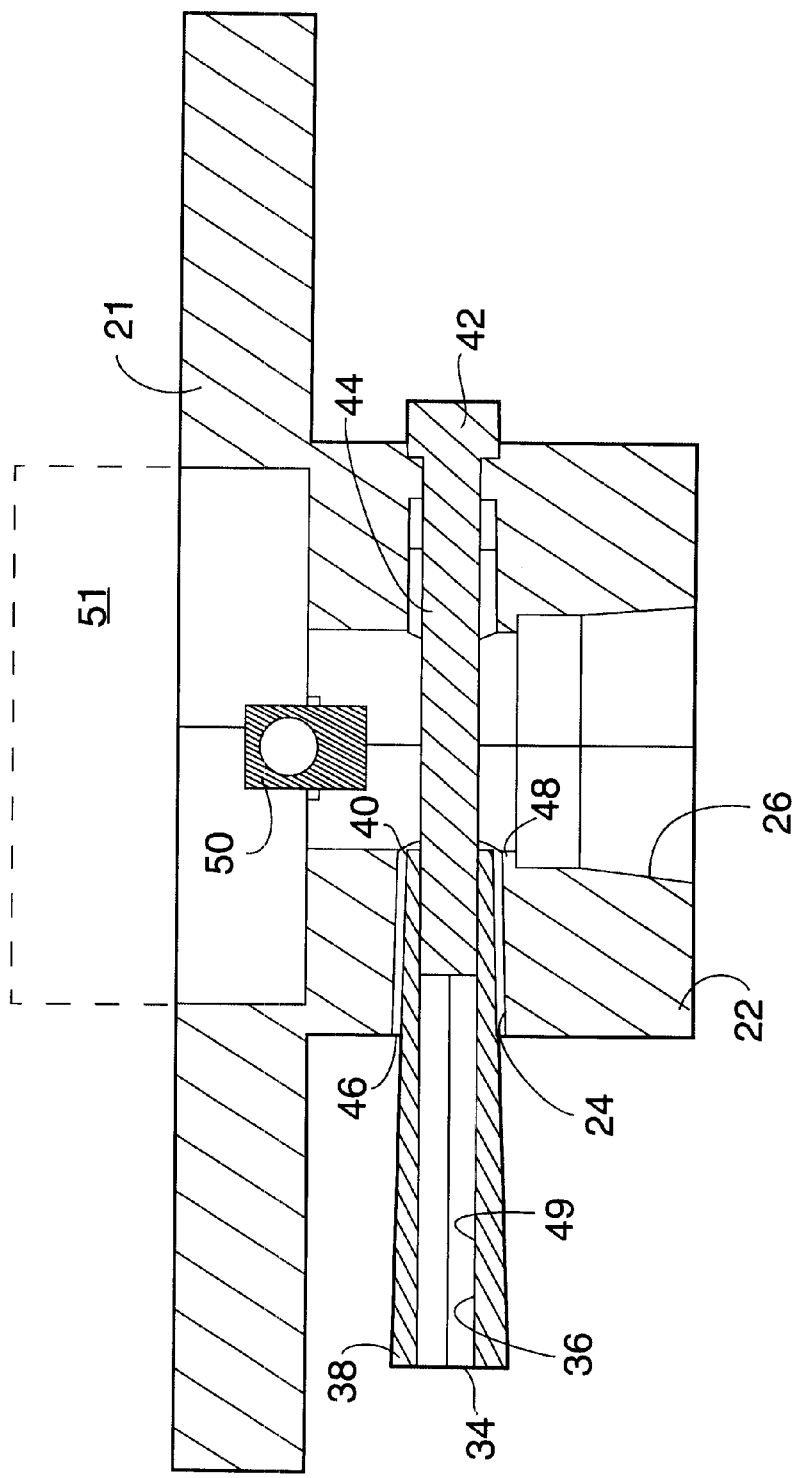
FIG. 2 shows the steering wheel prior to attachment to a steering shaft.

The assembly of the steering wheel prior to attachment to the steering shaft can be understood from FIG. 2. As can be seen in FIG. 2, pin 42 extends across the space 26 and into the taper pin 34. Threads 44 are received in internal threads 49 within the taper pin 34. A wedged or angled surface 48 is formed in the boss 22, and the wedge extends toward an upper surface of the boss from end 46 towards an opposed end 48.

A removal portion 50 is also shown, and will be explained below. An air bag 51 is shown schematically such that it will be clear that the present invention is particularly useful for so-called modular steering wheel and air bag arrangements, wherein the air bag is pre-assembled to the steering wheel prior to the steering wheel being attached to the steering shaft.

As can be appreciated in FIG. 2, a first securement member, pin 42, extends across the space 46, and into a second securement member, taper pin 34. The taper pin 34 does not extend into the space 26 at this time. The pin 42 is of a smaller size than the taper pin 34.

Figure 3:
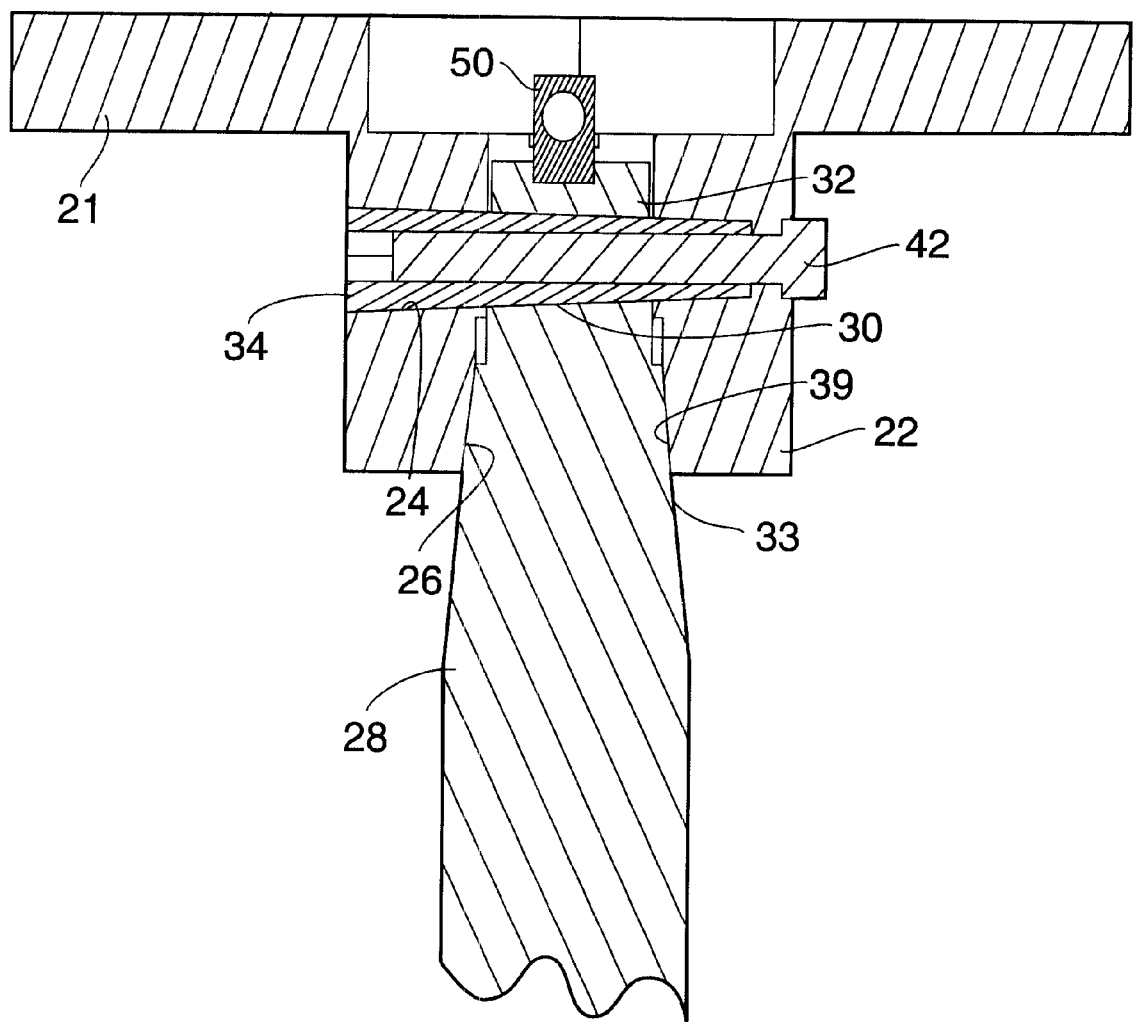
FIG. 3 shows the attachment of the steering wheel to the steering shaft.

FIG. 3 shows the attachment of the steering shaft 28 to the boss 22. The steering wheel body 21 is placed onto the steering shaft 28. An internally tapered surface 39 of the bore 26 moves onto the externally tapered portion 33.

The steering shaft moves into the opening 26 with the slot 32 moving over the relatively small pin 42 until the pin 42 is received within space 30. At that time, pin 42 is driven to draw the taper pin 34 into the space 26. Taper pin 34 has an outer diameter which is greater than the diameter of slot 32, and fits tightly within space 30. As can be seen, a surface of the boss 22 and the surface of the opening 30 which taper pin 34 rides along are both tapered. Thus, as the taper pin 34 is drawn from the left to the right between the position of FIG. 2 to the position of FIG. 3, the boss 22 is forced onto the steering shaft 28. As this occurs, a wedge lock is achieved between the surfaces 33 and 39. This wedge lock is sufficient to hold the steering wheel body 21 on the steering shaft 28 even if one or both of the securement members 42, 34 break or become loose.

Once secured, the steering shaft cannot rotate relative to the steering wheel. This is true because the taper pin 34, pin 42, and the wedge lock created between the steering shaft and the steering wheel all restrict rotation. It is also possible to add splines between the steering wheel and the steering shaft to further prevent rotation, although this is not necessary.

A further feature of this invention is that the use of the securement structure and the slot 32 ensures proper rotational alignment between the steering wheel and the steering shaft upon initial assembly. The securement structure, and in particular pin 42 must be aligned with the slot 32 for this steering wheel to move onto the shaft. This ensures the steering wheel is at the proper rotational position relative to the steering shaft, within a small number of degrees. This provides benefits in increasing the ease and speed of aligning the steering wheel and steering shaft when the second securment structure is drawn into place.

Thus, a simple and reliable method of attaching a steering wheel body, which in particular may be a modular steering wheel assembly, onto a steering shaft is disclosed. The securement structure is compact and inexpensive compared to the prior art.

Figure 4:
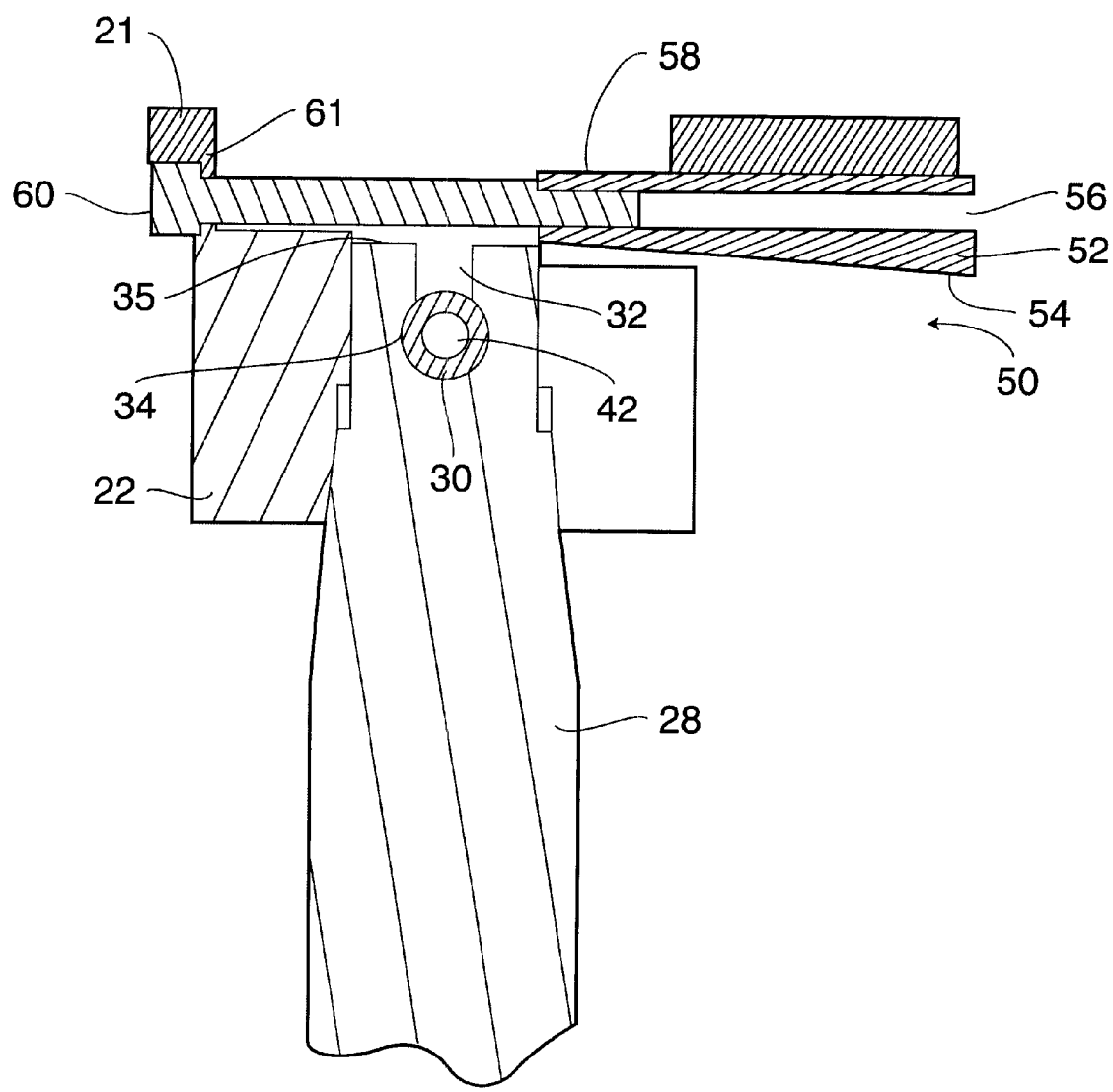
FIG. 4 shows structure for removing the steering wheel from the steering shaft.

FIG. 4 shows structure 50 for facilitating the removal of the steering wheel from the steering shaft 28. As shown, structure 50 includes a taper pin or wedge 52 having an angled surface 54 extending between an end 56 and an opposed end 58. A threaded pin 60 is received in a portion 61 of the hub unthreaded and extends within the taper pin 52. The taper pin 52 is drawn across the end surface 35 of the steering shaft 28 when the pin 60 is turned. The wedge surface 54 forces the boss 22 upwardly, and off of the steering shaft 28 during this movement. This will break the wedge lock and allow removal of the steering shaft from the steering wheel. As will be explained below, the taper pin 34 and pin 42 must be removed prior to the use of the removal structure 50.

Preferably, an access opening is provided through the housing or boss 22. This access opening will rotate with the wheel such that a worker will always be able to access the removal structure to assist in breaking the wedge lock.

Figure 5A:
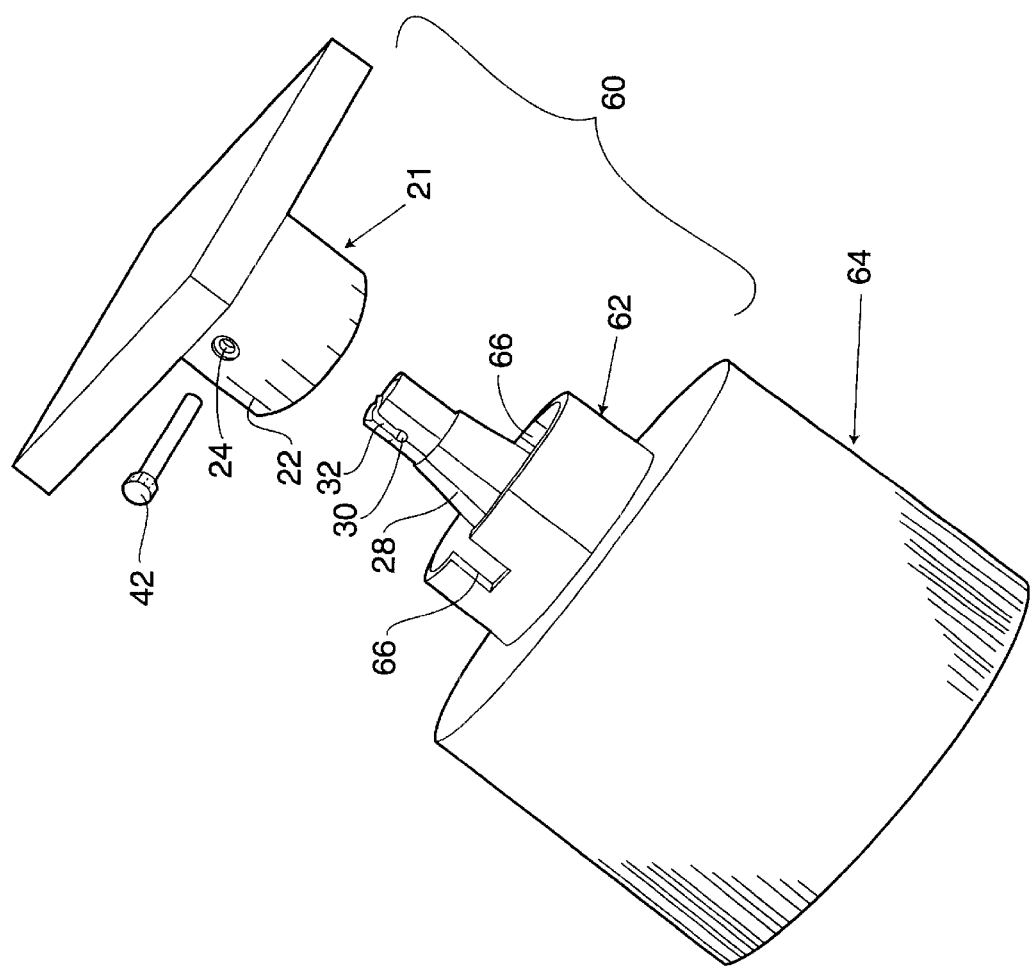
FIG. 5A shows an anti-theft feature of the present invention.

FIG. 5A shows another feature of the present invention. In FIG. 5A, embodiment 60 includes a sleeve 62 extending from a steering column body 64. Sleeve 62 and body 64 are fixed, and steering shaft 28 rotates with the steering wheel body 21 inside the sleeve 62 and the housing 64. As shown, slots 66 are formed in the sleeve 62.

Figure 5B:
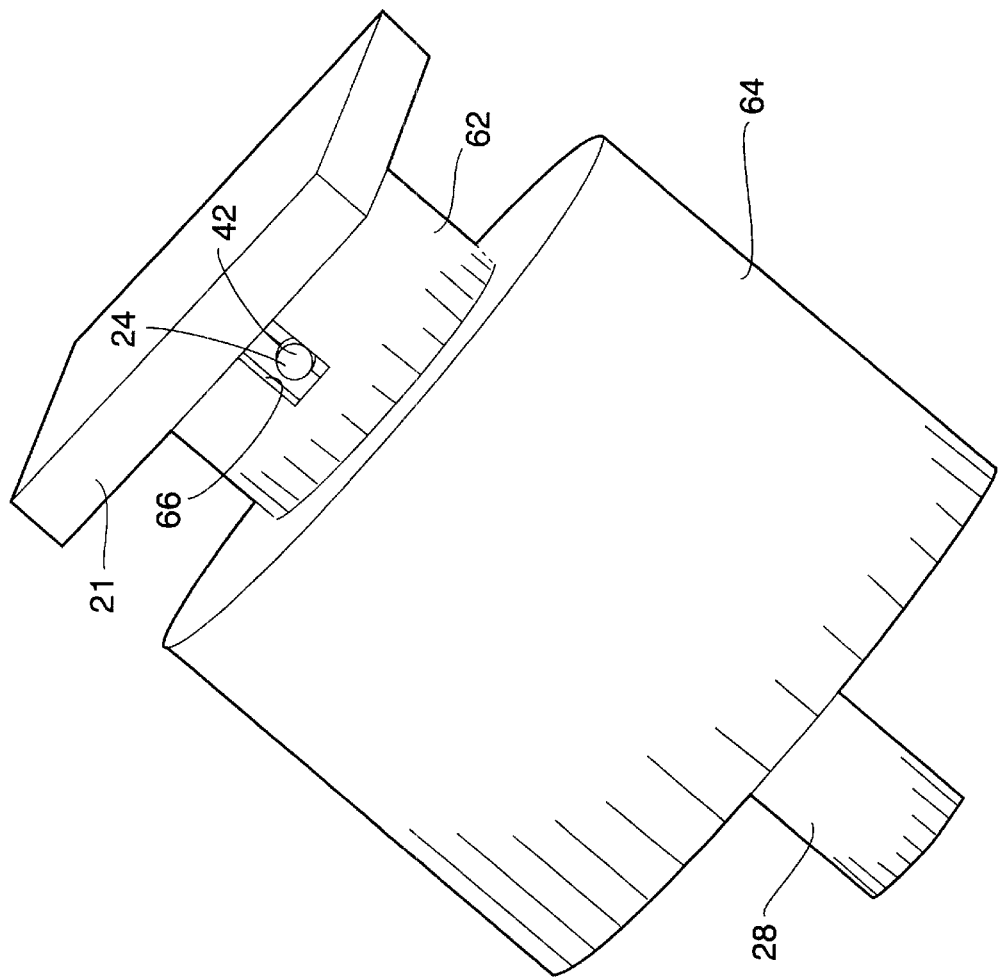
FIG. 5B shows the assembled anti-theft structure of FIG. 5A.

As shown in FIG. 5B, when assembled, the slots 66 may be aligned with the openings 24, or pin 42. This will facilitate the assembly of the steering wheel assembly onto the steering shaft. However, if this structure were left this way, then a thief would have access to the securement structure, and would be able to remove the steering wheel from the steering shaft.

Figure 6A:
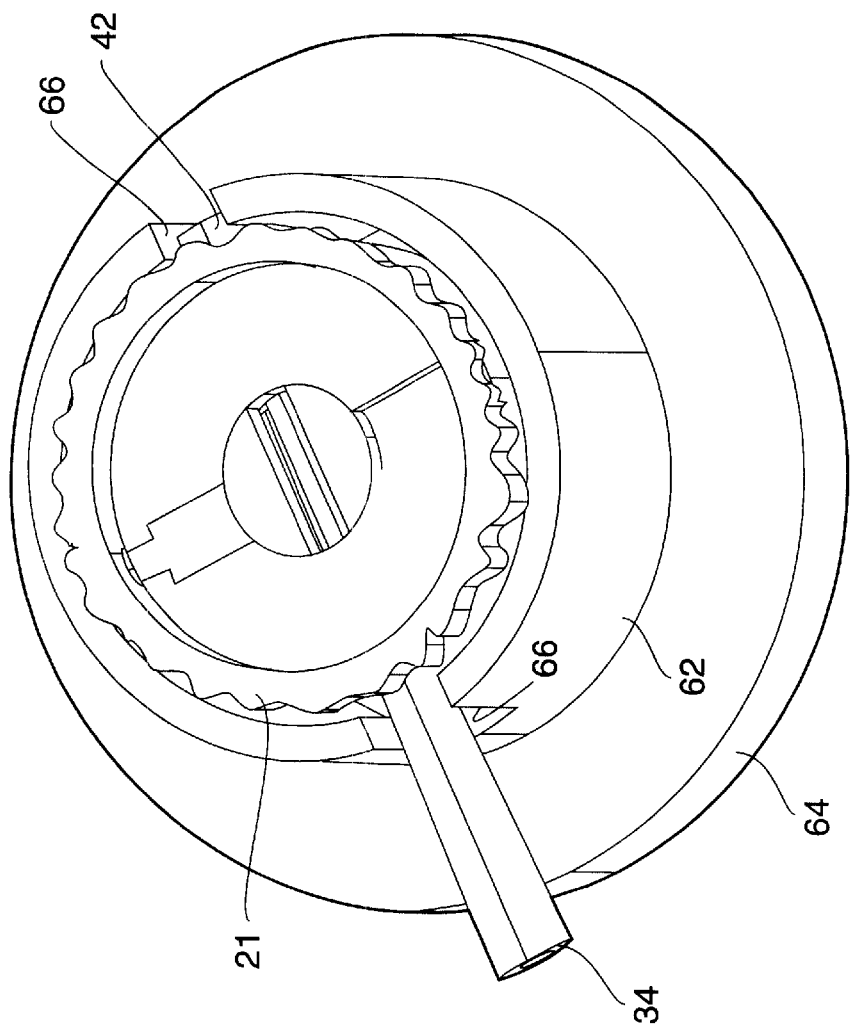
FIG. 6A is a cutaway partial view showing the use of the anti-theft structure.
Figure 6B:
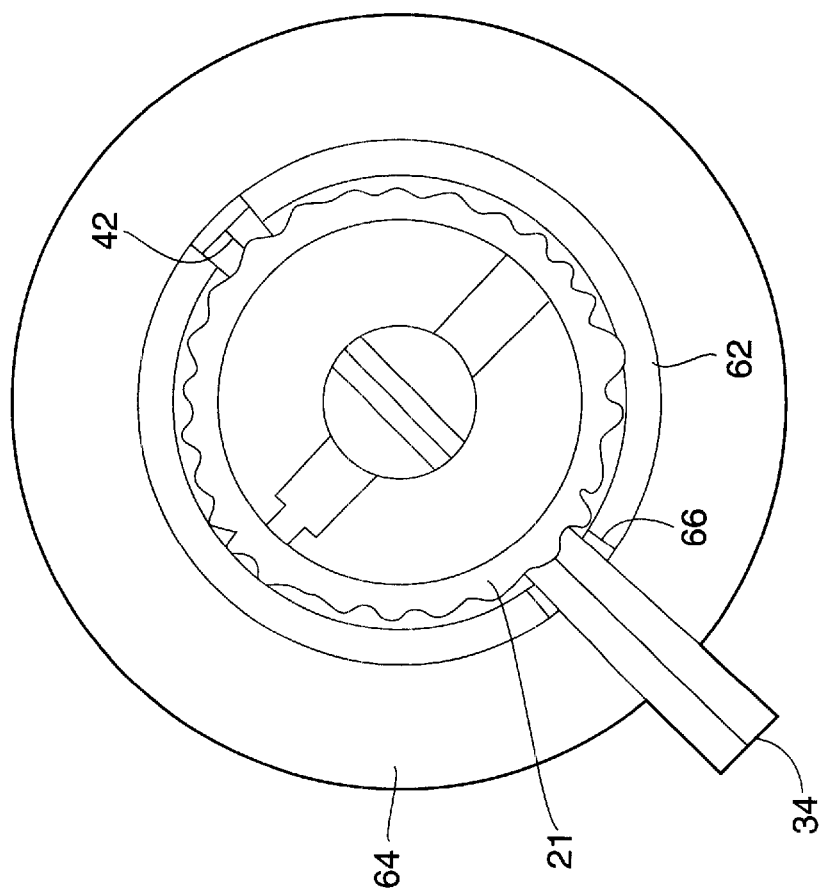
FIG. 6B is a cross-sectional view showing the subject matter of FIG. 6A.

As shown in FIG. 6A, taper pin 34 extends outwardly of slot 66 prior to securement pin 42 being turned. This is further shown in FIG. 6B. The taper pin 34 is preferably in this position when the wheel is moved onto the steering shaft 28. The pin 42 may be turned to draw the taper pin 34 into the space 30 in the steering shaft 28, as explained above.

Figure 6C:
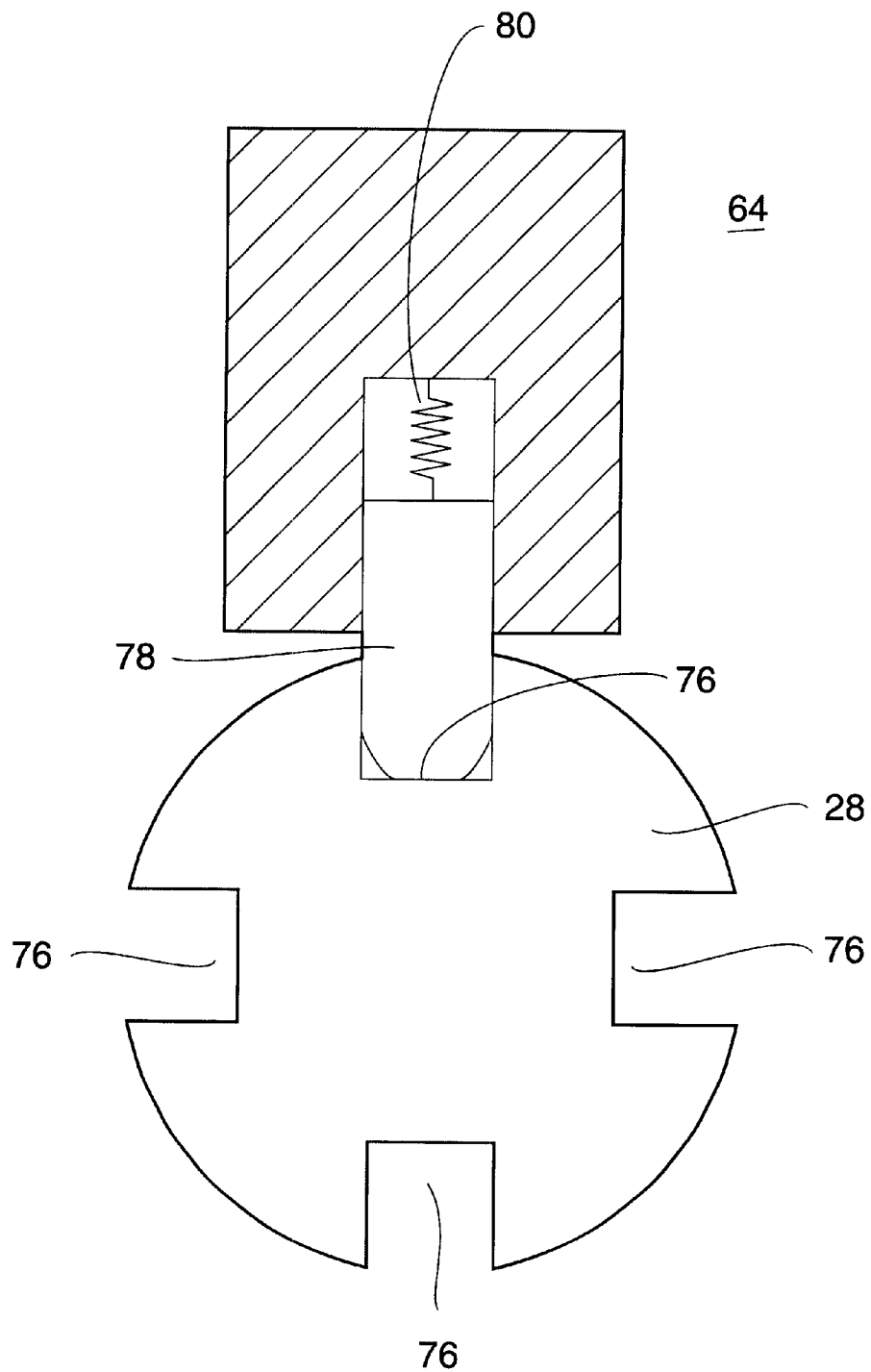
FIG. 6C is a schematic view of a structure for locking a steering shaft at a predetermined location.

The present invention ensures that the slots 66 are not aligned with the pins 34, 42 or the opening 24, when the steering shaft 28 is locked. As shown in FIG. 6C, a steering column 28 is formed with a plurality of openings 76, one of which selectively receives a pin 78 to lock the steering column 28 at a predetermined position. Although shown schematically, the structure, such as spring 80 or cam, for biasing the pin 78 into one of the openings 76 is known. Essentially, the steering shaft 28 is freely rotatable with the pin 78 removed from all of the openings 76 while the ignition is on. However, when the ignition is turned off, the pin 78 moves into one of the openings 76 locking the wheel at one of a predetermined number of locations relative to the housing 64. The present invention ensures that when the steering column 28 is at any one of the possible positions in the locked state, the opening 24 is not aligned with the slot 66. Thus, when the vehicle is deactivated and the steering wheel is locked, a thief will not have access through the slot 66 into the securement structure for removal of the steering wheel.

The thief will still have access to the access opening for removing the removal structure 50. However, the securement structure would still secure the steering wheel to the steering shaft. Since the thief would not have access to the securement structure, the thief would not be able to remove the securement structure. If the securement structure has not been removed, then the removal structure would not move the steering wheel off of the steering shaft.

Although a preferred embodiment of this invention has been disclosed, a worker of ordinary skill in the art would recognize that certain modifications come within the scope of this invention. For that reason, the following claims should be studied to determine the true scope and content of this invention.

What is claimed is:

1. A steering wheel and steering shaft assembly comprising:
    a steering shaft (28) for being attached to a steering wheel;
    a steering wheel body (21) for being attached to the steering shaft:
    a securement assembly (34,42) for securing the steering wheel to the steering shaft; and
    a removal assembly (50) for forcing the steering wheel body upwardly and off of the steering shaft when it is desired to remove the steering wheel body, and after removal of the securement assembly;
    wherein the removal assembly includes one pin (52) which is drawn by another pin (60) to move along a surface on at least one of the steering shaft and the steering wheel body, and force the steering wheel body off of the steering shaft.

2. A steering wheel and steering shaft assembly comprising:
    a steering shaft (28) extending from a first end remote from a steering wheel body (2) towards a second end (35) adjacent to the steering wheel body, the steering shaft having a slot (32) extending into an enlarged space (30), the slot having a first dimension which is smaller than a dimension of the space;
    a steering wheel body (21) having a bore (26) to receive the steering shaft, the steering wheel body having a first securement member (42) connected to a spaced second securement member (34), the first securement member (42) extending across the space and the first securement member having a second outer dimension which is less than the first dimension of the slot, such that the first securement member can move through the slot and into the enlarged space, the first securement member being operable to draw the second securement member into the space, the second securement member having a third outer dimension which is greater than the first dimension, such that the second securement member secures the steering wheel on the steering shaft when drawn into the space; and
    the first securement member passing through the slot and into the space to initially position the steering wheel on the steering shaft, and the first securement member then drawing the second securement member into the space to lock the steering wheel on the steering shaft.

3. An assembly as recited in claim 2, wherein the slot extends from the space to the second end of the steering shaft.

4. An assembly as recited in claim 2, wherein an outer sleeve (62) is fixed and surrounds the steering shaft and a portion of the steering wheel body, the outer sleeve (62) having slots (66) at circumferentially spaced locations, the slots providing access to the first and second securement members.

5. An assembly as recited in claim 4, wherein the steering shaft being selectively locked (76) in at least one position relative to said sleeve, the slot not being aligned with the securement members when the steering shaft is locked in at least one position.

* * * * *